United States Patent

[11] 3,609,045

| [72] | Inventor | Kurt Stein |
| | | 105 Pinehurst Ave., New York, N.Y. 10033 |
| [21] | Appl. No. | 862,793 |
| [22] | Filed | Oct. 1, 1969 |
| [45] | Patented | Sept. 28, 1971 |

[54] APPARATUS FOR STORING AND VISIBLY COMPARING THE OPTICAL PROPERTIES OF MINATURE SAMPLES
10 Claims, 7 Drawing Figs.

[52] U.S. Cl. .................................................. 356/212, 356/243, 356/244
[51] Int. Cl. .................................................. G01n 21/02
[50] Field of Search .................................................. 356/195, 243, 244, 204, 212, 246

[56] References Cited
UNITED STATES PATENTS

| 2,058,073 | 10/1936 | Fritzsching .................. | 356/243 |
| 2,380,244 | 7/1945 | Jones et al. .................. | 356/243 |
| 2,657,611 | 11/1953 | Borth .......................... | 356/243 |
| 3,036,894 | 5/1962 | Forestiere .................... | 356/246 |

FOREIGN PATENTS 403,142 9/1924 Germany......................

*Primary Examiner*—Ronald L. Wibert
*Assistant Examiner*—Orville B. Chew, II
*Attorney*—Edward F. Levy ABSTRACT: Apparatus for storing a plurality of samples having known optical properties and for displaying and samples in a manner wherein the latter may be readily compared with an unknown sample for matching color or other optical properties of the latter comprises a flexible, elongated carrier tape upon which known microsamples are mounted. The tape is fed to a viewing station at which a magnifier or microscope is utilized to view the known samples simultaneously with an unknown sample which is disposed in a fixed position in the viewing station. Indicia means on the carrier tape, and associated with each known sample is also located within the viewing station, so that when the carrier tape is moved until a known sample matches the unknown sample, the indicia means, viewed through the magnifier, identifies the color or other optical properties of the matched samples.

PATENTED SEP 28 1971
3,609,045
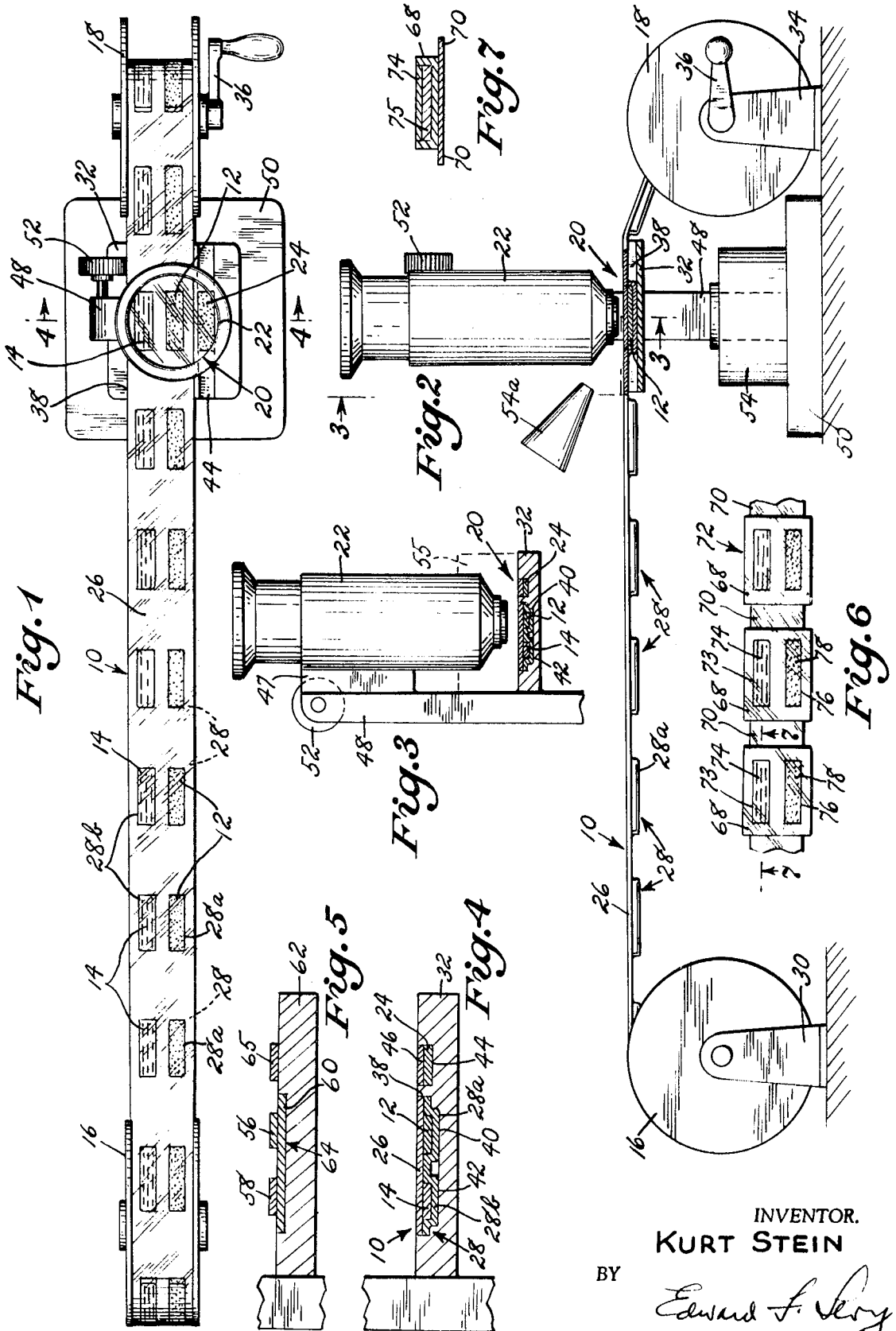
INVENTOR.
KURT STEIN
BY
Edward F. Levy
ATTORNEY 3,609,045

APPARATUS FOR STORING AND VISIBLY COMPARING THE OPTICAL PROPERTIES OF MINATURE SAMPLES

BACKGROUND OF THE INVENTION

It is frequently necessary to duplicate certain optical characteristics of a sample material for which no information or background is available. For example, fabric dye houses are constantly presented with a swatch of fabric for purposes of matching the color on a new dye lot. For matching purposes, the dye house keeps a file or catalog of sample fabrics dyed with each of its colors or finishes, and a visual comparison must be made between the unknown swatch and the sample fabrics until the match is ascertained. Each of the samples bears the corresponding dye formulation or a coding of the same, so that when the correct sample is identified, the proper dye can be prepared and used.

The conventional procedure described above has several serious disadvantages. The matching process is usually burdensome and time consuming in that it is necessary to visually examine a large number of sample pieces of fabric before the proper match is identified. The process is further complicated where the customer specified that the match must be made for different types of light, for example, daylight, fluorescent light, incandescent light, etc.

In addition, the usual sample swatches are of relatively large size and are bulky so that, when present in large numbers, they require a large amount of storage space and are difficult to locate, handle and replace properly. As a result, a haphazard and unorderly search frequently occurs, and when the proper match is finally made, if the identified sample is improperly labeled additional time and effort may be required to identify the dye to be employed.

According to the present invention the aforesaid difficulties are overcome by mounting miniature samples on a carrier belt or tape (e.g. a plastic strip), suitably identifying each sample on the carrier tape, and rolling up the tape on a reel for easy storage and retrieval. In use, the carrier tape is unwound from its supply reel and magnifying means is provided to simultaneously view the known samples on the carrier tape and an unknown sample fixed in position within view of the magnifying means to facilitate locating the match for the unknown sample.

An object of the invention is to provide apparatus for storing and comparing samples which occupies a minimum amount of storage space, which facilitate retrieval and orderly display of known samples, which is adaptable to duplicate known lighting conditions to facilitate matching of the samples with known samples under conditions encountered where the product made in accordance with said samples are to be actually used, and which is adaptable to handle a wide variety of different kinds of materials having various optical properties.

Additional objects and advantages of the invention will become apparent during the course of the following specification when taken in connection with the accompanying drawings.

SUMMARY OF THE INVENTION

Apparatus for storing and comparing samples comprises a flexible elongated carrier means adapted to be rolled onto a reel or the like. A plurality of samples having known properties are mounted along the length of the carrier means and suitable indicia are included on the carrier means to identify each sample. Operable means are utilized to feed said carrier means to a viewing station. Instrument means sensitive to optical properties of the samples is disposed at viewing station and is utilized to simultaneously view the known samples and an unknown sample which is disposed in a fixed position at the viewing station. The carrier means is fed through the viewing station until a known sample matches the unknown sample whereupon the indicia on the carrier means associated with the known sample will reveal the optical characteristics of the unknown sample, thereby facilitating its reproduction on a manufactured product or the like.

BRIEF DESCRIPTION OF THE DRAWING

FIG. 1 is a top plan view of a sample storing and comparing device constructed to one embodiment of the invention;

FIG. 2 is an elevational view, partly broken away, and partly in section, of the device shown in FIG. 1;

FIG. 3 is a section taken substantially along line 3—3 of FIG. 2;

FIG. 4 is an enlarged section taken along line 4—4 of FIG. 1 showing the samples mounted on the bottom of the carrier tape;

FIG. 5 is a sectional view similar to FIG. 4 but showing an alternate embodiment in which the samples are mounted on top of the carrier tape;

FIG. 6 is a partial top plan view of a further alternate carrier tape;

FIG. 7 is a sectional view taken along line 7—7 of FIG. 6.

Referring in detail to the drawings, and particularly to FIGS. 1 through 4 which illustrate a preferred embodiment of the invention, there is shown an elongated, flexible carrier tape or strip 10 on which are permanently mounted a series of known samples 12. The carrier tape 10 is preferably of a narrow width, for example one inch or less, and is of any suitable length. It is desirable to make the carrier tape as long as practically possible and to store it upon a reel 16 or the like so that it will mount a large number of closely spaced samples 12 which are preferably in the form of microsamples. In this manner, the samples may be rapidly scanned under a magnifying device, as will be presently explained, and the entire reel-mounted carrier containing a very large number of samples may be conveniently stored in a minimum of space.

The carrier tape 10 is preferably formed of thin transparent plastic, and also carries a plurality of indicia means 14 arranged adjacent each of the known samples 12 for identifying the latter, as will be presently explained.

FIG. 1 illustrated the manner in which the carrier tape 10 is employed for the matching of optical properties of samples, for example for the matching of colors. Stated generally, the carrier tape 10 is stored on the supply reel 16 and fed to a takeup reel 18. Intermediate the two reels is a viewing station 20 having a magnifying means 22 to view the known samples 12 and the indicia means 14. An unknown sample 24, which is to be compared to the known samples 12, is disposed in the viewing station 20 within the range of the magnifying means 22. Accordingly, as the tape 10 carries each known sample 12 into the viewing station 20, each such known sample 12 may be compared with the unknown sample 24 through the magnifying means 22.

Turning to a more detailed description of the illustrated embodiment, the carrier tape 10 may comprise a ribbon of transparent flexible plastic film 26, on one side of which the known samples 12 and indicia means 14 are mounted. Identical strips or sheets of plastic film 28, which may be of the same materials as that of the carrier tape 10, are affixed to the under surface of the latter at spaced intervals. Each film sheet 28 is formed with a pair of depressions or concavities 28a and 28b to respectively encapsulate the known samples 12 and indicia means 14, as can best be seen in FIG. 4. The strips of plastic 28 may be affixed to the tape 10 by adhesive, heat sealing, or by other suitable means. Alternatively, instead of utilizing separate strips 28 for each sample and its indicia means, a continuous ribbon (not shown) of flexible plastic material may be affixed to the carrier tape 10, with the known samples 12 and indicia means 14 sandwiched therebetween. Encapsulating the samples prevents wear and contamination by dirt or the like during rolling on and off the reels and during storage.

The known samples 12 may consist of various materials as will be hereinafter described. However, by way of example, the known samples 12 illustrated in FIGS. 1 to 4 will be regarded as small cuttings of fabric and will be described as such hereafter. Similarly, the indicia means 14 which identifies the color or other characteristic of the known samples, may constitute wording or numbers printed directly on the surface of the plastic film 26. In FIGS. 1 to 4, however, the indicia means 14 is shown, by way of example, as comprising printed indicia cards of paper, cardboard, or transparent plastic, and will be referred to as such.

It will be observed in the drawing that a fabric sample 12 and indicia card 14 are paired and mounted at spaced intervals along the length of the carrier tape 10. Each indicia card 14 identifies the known fabric sample 12 with which it is paired. For example, each fabric sample may be of particular color obtained by utilizing a particular die or mixture of dies according to a known formula. Each indicia card 14 would contain information identifying the color of the fabric sample it is paired with, so that the needed information for reproducing the particular color of the sample is readily available.

The samples of fabric may be arranged in a predetermined order on the carrier tape to facilitate matching with unknown samples. For example, known samples may be arranged on the carrier belt in a series of various shades of blue ranging progressively from a pale blue to a dark blue. By comparing an unknown blue sample with each known sample in the series with the aid of the magnifying means 22, as will be explained, a known sample matching the unknown sample may be readily located on the carrier tape 10. Once located, the indicia card associated with the located sample will provide the required information for the production of a fabric having the same color as the previously unknown sample.

The known samples 12 and indicia means 14 may be very small so that a large number may be incorporated on a single carrier tape 10, and the latter may be wound on the supply reel 16 for convenient storage of the many samples in a small space until ready for use. The samples 12 may thus constitute very small cuttings of fabric, and may be termed "microsamples."

When the reel 16 is ready to be used, it is mounted for free rotation on a support stand or bracket 30. The end of the carrier tape 10 which may have a suitable leader thereon is passed over the top of a viewing table 32 of the viewing station 20 and onto the takeup reel 18. The latter is mounted for free rotation on a support stand 34 provided with a suitable crank arm 36 to rotate the takeup reel 18, thereby to pull the tape 10 through the viewing station 20 as it is fed from the supply reel 16.

The viewing table 32 comprises a generally flat plate having an open top groove or channel 38 therein conforming generally to the cross-sectional configuration of the belt 10 and encapsulated sample fabric 12 and indicia card 14. As can best be seen in FIG. 4, the top of the tape 10 is flush with the top of the viewing table 32. Also the bottom of the tape 10 is in full contact with the bottom of the channel 38 in that the latter has two depressions 40 and 42 to accommodate the concavities 28a and 28b containing the known sample 12 and indicia means 14, and to guide the samples and the indicia means within the field of view of the magnifying means 22, which may be a low-power microscope.

While various samples 12 may constitute fabrics of different thicknesses, if such samples are squeezed into the concavities 28a so that they fill the latter, the top surface of those samples will always be at the same level or horizontal position when disposed in the viewing station 20, so that all of the samples 12 will be in focus when viewed through the magnifying means 22 as the carrier tape is drawn therebeneath. Similarly, the concavity 22b is sized to locate the top surface of the indicia card 14 at the same level so that it is also in focus, and thus the known samples 12 and indicia means 14 disposed in the channel 38 may be simultaneously observed by the magnifying means 22. As shown in FIG. 2, the centers of the supply reel 16 and takeup reel 18 are lower than the viewing table 32 so that tension on the carrier tape 10 imparted by the pull of the takeup reel 18 tends to seat the belt 10 and encapsulated samples 12 and indicia means 14 in the bottom of the channel 38. The channel 38 extends the full width of the viewing table 32 so that the tape 10 traverses a level path in entering and exiting from channel 38.

In order to compare the known sample with an unknown sample disposed at the same level, a second channel 44 is included in the viewing table 32 to accommodate the unknown sample 24. As in the case of the first channel 38, the second channel 44 is located within the viewing field of the magnifying means 22 so that each known sample and its indicia means located in the viewing station 20 may be simultaneously viewed with the unknown sample 24 through the magnifying means 22. The second channel 44 has a depth which will dispose the unknown sample 24 at the same level as the known samples 12, thereby permitting a fixed and focused setting of the magnifying means 22 for all of the samples to be viewed.

As may be deemed appropriate, the unknown sample 24 may be covered with a strip of plastic material 46 of the same material as that from which the carrier tape 10 is made so that all samples are viewed through the same media to minimize the affects of any distortion or other aberration caused by such media. The channel 44 may extend the full width of the viewing table 32 so that the known sample 24 and covering strip 46 may be slid in from the side of the viewing table 32.

The magnifying means 22 for viewing the samples may comprise a microscope suitably supported by a bracket 47 on an upright standard 48 on which the viewing table 32 is supported and which in turn is fixed to a base 50. Suitable means such as the hand wheel 52 are provided to adjust the height of the microscope 22 relative to the viewing table 32 for focusing purposes.

As previously mentioned, the device herein described may be used to match the color of an unknown sample fabric with a known sample so that a fabric product may be colored the same color as the heretofore unknown sample. In order to facilitate viewing of the sample fabrics under the same lighting conditions as those encountered in the location where the finished fabric product is to be ultimately used, suitable illuminating means may be employed within the magnifying means 22. For example, an adjustable lighting box 54 may be mounted on the base 50 beneath the viewing table 32, for directing a beam of light upwardly through a transparent sample 12 such as glass or clear plastic and through the unknown sample 24 in the viewing station 20. For illuminating fabric samples which are not transparent, a box 54a is attached to a mounting (not shown) and is located above the viewing station 20 so as to direct a beam of incident light upon the fabric samples 12 and 24; or an incident light beam is generated for this purpose by other suitable means. The lighting boxes 54 and 54a are of the variable illuminating type, containing different sources of illumination and/or filters for simulating different types of lighting. Thus, the boxes 54 and 54a may be selectively adjusted to illuminate the samples with desired types of lighting such as daylight, fluorescent lighting, etc. In addition, a shield or skirt, shown in phantom at 55 in FIG. 3 only, may be provided to exclude external light from the surrounding environment.

FIG. 5 illustrates an alternate type of carrier tape 60 which is similar to the carrier tape 10 except that the unknown samples 56 and indicia means 58 are suitably mounted on the upper surface of the tape 60, for example by adhesive, and are not encapsulated or otherwise covered as in the case of the prior embodiment. The viewing table 62 in this instance has a channel 64 having a depth and width corresponding respectively to the thickness and width of the plastic tape 60. When the tape 60 is disposed in the channel 64, the bottom surfaces of the known sample 56 and indicia means 58 will be flush with the upper surface of the viewing table 62. Accordingly, the unknown sample 65 may be placed directly on top of the viewing table 62 and will be disposed at the same level as the known sample 56 and indicia means 58.

In a further alternate embodiment shown in FIGS. 6 and 7, known samples 66 of plastic, glass or other materials may be compared with an unknown sample (not shown) by providing carriers 68 suitably joined to one another by hinge elements 70 which may be in the form of thin plastic strips. The carriers 68 and their connecting hinge elements 70 thus form a flexible carrier tape 72. The joined carriers 68 may be rolled up on a reel as previously described, but in this instance no storage reel is required, and the hinged carrier tape may be brought to a compact storage condition merely by folding up the hinged carriers in accordion fashion. Each carrier 68 has a channel 73 to receive the known sample 75 and a window 74 made of transparent plastic or the like covering the sample 75 and enclosing it within the channel 73. A channel 76 may also be provided in the carrier 68 to receive indicia means 78. Different transparent materials may be used for the window 74 to duplicate conditions under which the final product s to be viewed in actual use. For example, a product is to be normally viewed through a pane of glass, the window 74 may be made of the same type of glass.

While the indicia means has been illustrated and described as being in the form of a small card encapsulated in the carrier tape adjacent to the samples, it is to be understood that the indicia means may be printed or otherwise applied directly to the carrier tape adjacent the associated sample, thereby eliminating the separate indicia card and the requirement to have it encapsulated. The indicia means may be coded so that a number, letter, or combination thereof would be sufficient to identify the sample.

Instead of using a microscope for viewing the samples, a colorimeter or other instrument sensitive to optical properties of the samples may be employed. Thus, the device of the present invention may be used for matching various optical properties including color, surface finish, luster, transparency and such other properties as might be produced and reproduced by dyeing, bleaching, printing, blending, fusing, synthesis, chemical or mechanical treating or by any other method used for changing the appearance of textiles, plastics, glass, paper, metal or other material.

The samples mounted on the tape may be of any convenient size, it is preferable that they be in the form of microsamples so that a larger number may be stored on a single tape while still permitting adequate viewing suitable for comparing with an unknown sample by the use of a microscope. Since a very large number of such microsamples may be included within a relatively small space, such samples may be economically stored in a locked and fireproof storage space secured against loss or theft of valuable and possibly confidential information. Storage of the same number of conventional samples would be much more difficult and expensive.

As may be desired, blank spaces may be provided on the carrier tape to accommodate new samples. Also new samples may be added by dividing the tape and splicing in an additional length of tape having new samples mounted thereon.

While preferred embodiments of the invention have been shown and described herein, it is obvious that numerous additions, changes and omissions may be made in such embodiments without departing from the spirit and scope of the invention.

What is claimed is:

1. Apparatus for storing a plurality of miniature samples having characteristic optical properties, and comparing said samples successively with an unknown sample for matching the optical properties thereof, said apparatus comprising a flexible, elongated carrier, a plurality of known miniature samples mounted on said carrier, said known samples being spaced in a linear row parallel to the longitudinal axis of said carrier, a plurality of indicia means mounted on said carrier means in a linear row parallel to said row of known samples, each of said indicia means being aligned with an associated known sample for identifying the latter, means defining a viewing station, operable means engaging said carrier means to draw the latter through said viewing station whereby said known samples are successively moved into said viewing station and into side-by-side proximity with an unknown sample located at said viewing station, and instrument means at the viewing station for simultaneously viewing the optical properties of each successive known sample with said unknown sample.

2. Apparatus according to claim 1 wherein said carrier comprises an elongated, transparent plastic tape, and means are provided for affixing said known samples at spaced intervals along the length of said plastic tape.

3. Apparatus according to claim 2 wherein said affixing means comprises a length of plastic material adhered to said elongated plastic tape to encapsulate said known samples therebetween.

4. Apparatus according to claim 2 wherein said affixing means comprises strips of plastic material adhered to the bottom surface of said elongated plastic tape, each of said plastic strips being formed with a concavity for receiving and encapsulating one of said known samples.

5. Apparatus according to claim 1 wherein said instrument means comprises a magnifier device having a field of view covering said viewing station whereby said unknown sample, and the known and associated indicia means located at the viewing station are simultaneously magnified.

6. Apparatus according to claim 5 in which said known samples are microsamples.

7. Apparatus according to claim 1 further comprising adjustable lighting means for illuminating said known and unknown samples at said viewing station with selected types of lighting.

8. Apparatus according to claim 1 wherein said viewing station includes a viewing table underlying said instrument means, said viewing table having channels in the top surface thereof to guide said carrier longitudinally through said viewing station and to support said carrier with said known samples at a constant level.

9. Apparatus according to claim 8 wherein said indicia means comprises an element having printed matter thereon identifying the known sample associated therewith, and mounting means on said carrier for positioning said indicia element and associated known sample at substantially the same level while on said viewing table.

10. Apparatus according to claim 1 wherein said carrier means comprises a plurality of carrier elements joined to one another by hinge means, each of said carrier elements having a channel for receiving a known sample, and transparent means covering said known sample whereby the optical properties of the known sample are obtained though the transparent means.